(12) United States Patent
Sakai et al.

(10) Patent No.: US 11,415,092 B2
(45) Date of Patent: Aug. 16, 2022

(54) FUEL TANK CHECK VALVE

(71) Applicant: PIOLAX, INC., Kanagawa (JP)

(72) Inventors: Takahiro Sakai, Kanagawa (JP); Yusuke Ochiai, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 210 days.

(21) Appl. No.: 17/046,643

(22) PCT Filed: Mar. 18, 2019

(86) PCT No.: PCT/JP2019/011173
§ 371 (c)(1),
(2) Date: Oct. 9, 2020

(87) PCT Pub. No.: WO2019/198435
PCT Pub. Date: Oct. 17, 2019

(65) Prior Publication Data
US 2021/0180549 A1 Jun. 17, 2021

(30) Foreign Application Priority Data
Apr. 10, 2018 (JP) .............................. JP2018-075266

(51) Int. Cl.
*F16K 15/06* (2006.01)
*F02M 37/00* (2006.01)
*B60K 15/03* (2006.01)

(52) U.S. Cl.
CPC ......... *F02M 37/0023* (2013.01); *B60K 15/03* (2013.01); *B60K 2015/03282* (2013.01); *F16K 15/063* (2013.01)

(58) Field of Classification Search
CPC ................ F02M 37/0023; B60K 15/03; B60K 2015/03282; F16K 15/063
See application file for complete search history.

(56) References Cited

U.S. PATENT DOCUMENTS 6,340,031 B1 1/2002 Matsumoto et al.
6,575,190 B1 6/2003 Rosseel et al.
(Continued)

FOREIGN PATENT DOCUMENTS

CN       1619134 A      5/2005
CN    101144447 A      3/2008
(Continued)

OTHER PUBLICATIONS

International Search Report issued in PCT/JP2019/011173 dated Jun. 18, 2019 with English Translation (3 pages).

*Primary Examiner* — P. Macade Nichols
(74) *Attorney, Agent, or Firm* — Nakanishi IP Associates, LLC

(57) ABSTRACT

To provide a fuel tank check valve making it easy to assemble a cap to a valve element housing. This fuel tank check valve has a body tube provided with a valve element housing, a valve element, a cap, and a spring, wherein the valve element housing has a base end side frame, a tip end side frame to which the cap is mounted, and a first coupling frame connecting the both frames, the tip end side frame is provided with a retraction portion having a shape in which a circumferential part is retracted from the tip end surface thereof to the base end side frame side, the cap is formed with a notch whose circumferential part is notched, and the cap is assembled to the valve element housing so that the notch is positioned in the retraction portion.

7 Claims, 16 Drawing Sheets

(56) References Cited

U.S. PATENT DOCUMENTS

| | | |
|---|---|---|
| 7,380,569 B2 | 6/2008 | Takahashi |
| 8,042,788 B2 | 10/2011 | Kobayashi et al. |
| 2005/0028873 A1 | 2/2005 | Martin et al. |
| 2005/0103385 A1 | 5/2005 | Takahashi |
| 2008/0067466 A1 | 3/2008 | Kobayashi et al. |
| 2010/0126603 A1 | 5/2010 | Yamaguchi |
| 2017/0298878 A1* | 10/2017 | Ellis, Sr. ................ B60K 15/04 |
| 2018/0222314 A1* | 8/2018 | Sakai ..................... B60K 15/04 |

FOREIGN PATENT DOCUMENTS

| | | | |
|---|---|---|---|
| CN | 103062452 A | 4/2013 | |
| GB | 2327741 A | 2/1999 | |
| JP | 2000-016097 A | 1/2000 | |
| JP | 2010-125947 A | 6/2010 | |
| WO | WO-2009019489 A1 * | 2/2009 | ............ B60K 15/04 |
| WO | 2016/110377 A1 | 7/2016 | |

\* cited by examiner

FUEL TANK CHECK VALVE

TECHNICAL FIELD

The present invention relates to fuel tank check valve provided on the downstream side of a fuel supply pipe of a fuel tank.

BACKGROUND ART

For example, a fuel supply pipe coupled to an oil supply port is connected to a fuel tank of an automobile, and fuel is supplied into the fuel tank through the supply pipe. A valve (check valve) for preventing backflow of fuel is often attached to the downstream side of the fuel supply pipe. The check valve is opened at the time of refueling to allow the fuel to flow into the tank and is closed after refueling to prevent the fuel from flowing back into the fuel supply pipe.

As a conventional check valve of this type, Patent Literature 1 described below describes a fuel tank check valve including a body tube and a valve element housed and arranged axially and slidably on the downstream part of the body tube. The body tube has a reduced-diameter cylindrical tube part, and an outflow tube part with a diameter is larger than that of the reduced-diameter cylindrical tube and the outflow tube part is coupled to the downstream side end of the reduced-diameter cylindrical tube. The outflow tube part has a substantially cylindrical frame shape circumferentially provided with a plurality of opening windows, and the outflow tube part has a peripheral wall inner surface on the reduced-diameter cylindrical tube part side forming a tapered valve seat. The downstream side wall of the outflow tube part has an annularly continuous shape, and a plurality of holes is formed at predetermined positions. A substantially circular plate-shaped cap provided with a plurality of openings is mounted on the downstream side end of the outflow tube part, and a spring biasing the valve element toward the valve seat side is supported on the cap. Furthermore, a plurality of engagement projections that engage with the holes of the outflow tube part is formed on the outer periphery of the cap.

CITATION LIST

Patent Literature

PATENT LITERATURE 1: JP-A-2010-125947

SUMMARY OF INVENTION

Problems to be Solved by Invention

In the check valve of Patent Literature 1, the cap is assembled to the outflow tube part by arranging the valve element in the outflow tube part, then supporting one end of a spring on the inner surface side of the cap to align each engagement projection of the cap with each hole of the outflow tube part, pressing the cap into the outflow tube part side in that state, and engaging each engagement projection with each hole while pushing out the downstream side wall of the outflow tube part.

However, since the downstream side wall of the outflow tube part has an annular shape and the cap also has a substantially circular plate shape, it is necessary to appropriately turn the cap circumferentially with respect to the hole of the outflow tube part to match the engagement projection, and hence alignment is difficult. Furthermore, since the downstream side wall of the outflow tube part has an annular shape, the rigidity is relatively high, and it is difficult to push out with the cap. For these reasons, the check valve described above has a disadvantage of difficulty in assembling the cap to the outflow tube part.

Therefore, it is an object of the present invention to provide a fuel tank check valve, allowing a cap to be easily assembled to a valve element housing provided in a body tube.

Solution to Problems

In order to achieve the above object, the present invention is a check valve provided on a downstream side of a fuel supply pipe for supplying fuel to a fuel tank, the check valve including: a body tube having a connection portion connected to the fuel supply pipe on a base end side positioned on an upstream side in a fuel supply direction, and provided with a valve element housing having a valve seat on a tip end side positioned on a downstream side in the fuel supply direction; a valve element housed in the valve element housing slidably with respect to an axial direction of the body tube, and having a seal coming into contact with and separating from the valve seat; a cap assembled on a tip end side of the valve element housing;

a spring supported by the cap and biasing the valve element in a direction abutting against the valve seat; and a locking portion provided between the valve element housing and the cap, wherein the valve element housing has an annular base end side frame provided with the valve seat in an inner periphery, an annular tip end side frame arranged on a tip end side relative to the base end side frame and to which the cap is mounted, and a plurality of circumferentially arranged first coupling frame axially coupling the base end side frame and the tip end side frame, the tip end side frame is provided with a retraction portion formed in such a manner that a circumferential part is retracted to the base end side frame side from a tip end surface, the cap is formed with a notch whose circumferential part is notched when the body tube is viewed from the axial tip end side, and the cap is assembled in the valve body housing so that the notch is positioned in the retraction portion.

Effects of Invention

According to the present invention, since the body can be assembled to the valve element housing by positioning the notch of the cap in the retraction portion of the valve element housing and locking the body to the valve element housing by the locking portion, the cap can be easily aligned circumferentially to the tip end side frame of the valve element housing, and the assembling workability of the cap to the valve element housing can be improved. Furthermore, by providing the retraction portion in the tip end side frame of the valve element housing, the tip end side frame can be easily expanded, and the cap can be easily assembled.

BRIEF DESCRIPTION OF DRAWINGS

FIG. 3A is a front view thereof and FIG. 3B is a side view thereof.

FIG. 4A is a front view thereof, FIG. 4B is a rear view, and FIG. 4C is a side view.

FIG. 13A is a front view thereof and FIG. 13B is a side view thereof.

FIG. 14A is a front view thereof and FIG. 14B is a side view thereof.

DESCRIPTION OF EMBODIMENTS

An embodiment of a fuel tank check valve according to the present invention will be described below with reference to the drawings.

Figure 10:
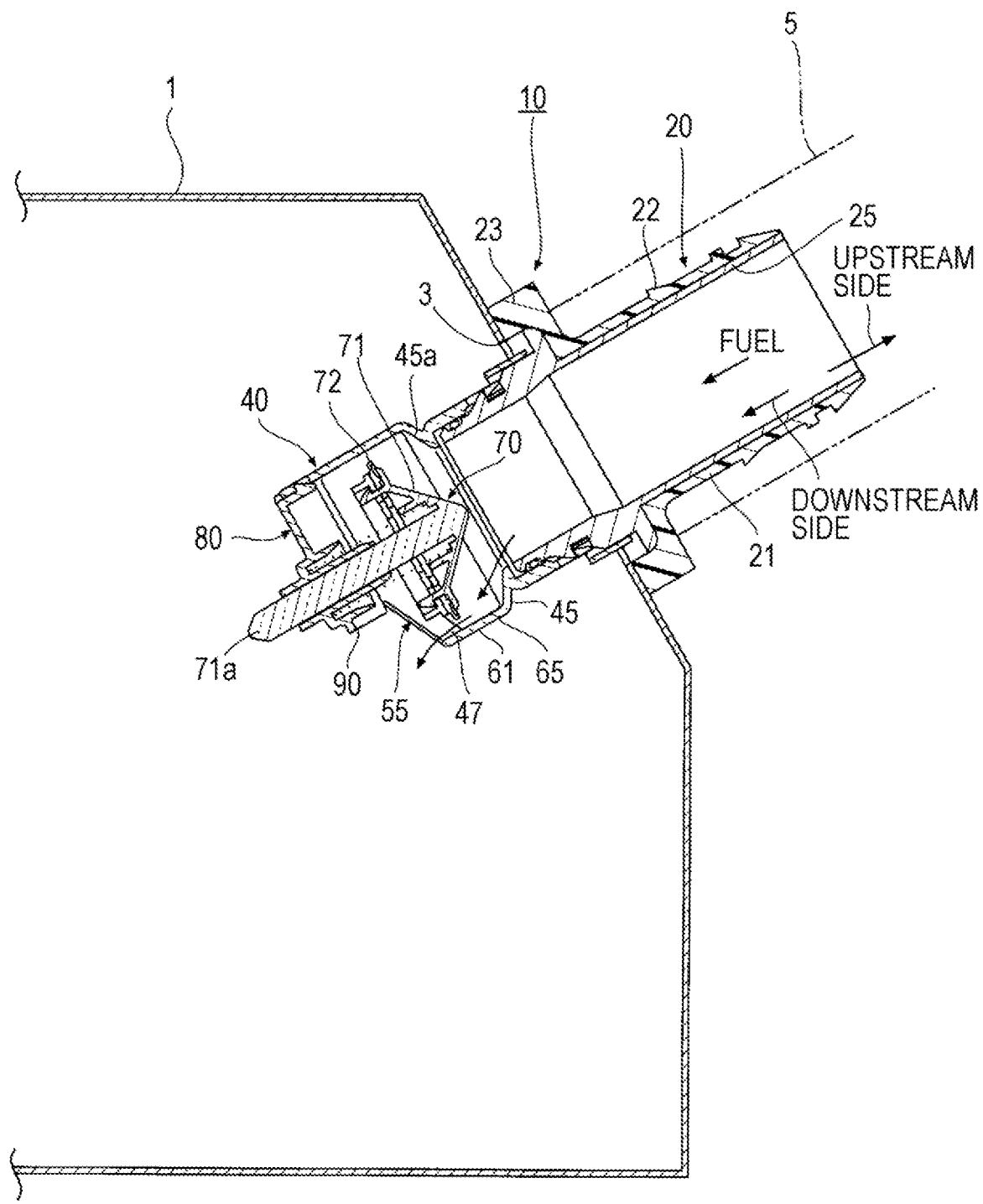
FIG. 10 is an explanatory view illustrating a use state of the check valve.

As illustrated in FIG. 10, a fuel tank check valve 10 (hereinafter referred to as a "check valve 10") is provided on the downstream side of a fuel supply pipe 5 (hereinafter referred to as a "supply pipe 5") of a fuel tank 1 and serves to allow fuel inlet into the supply pipe 5 from an oil supply port on the upstream side of the supply pipe 5 to flow into the fuel tank 1 through the supply pipe 5, and also to prevent the fuel flown into the fuel tank 1 from flowing back to the supply pipe 5 side. In the following description, "upstream side" and "downstream side" mean the direction in which fuel is supplied (fuel supply direction), and more specifically, the side of the supply pipe 5 to which the check valve 10 is provided is described as the downstream side, and the side of the supply pipe 5 to which the oil supply port is connected (opposite side to the check valve 10) is described as the upstream side. Furthermore, in each component of the check valve 10 to be described below, unless otherwise stated, "base end side" means the upstream side in the fuel supply direction, and "tip end side" means the downstream side in the fuel supply direction.

Figure 1:
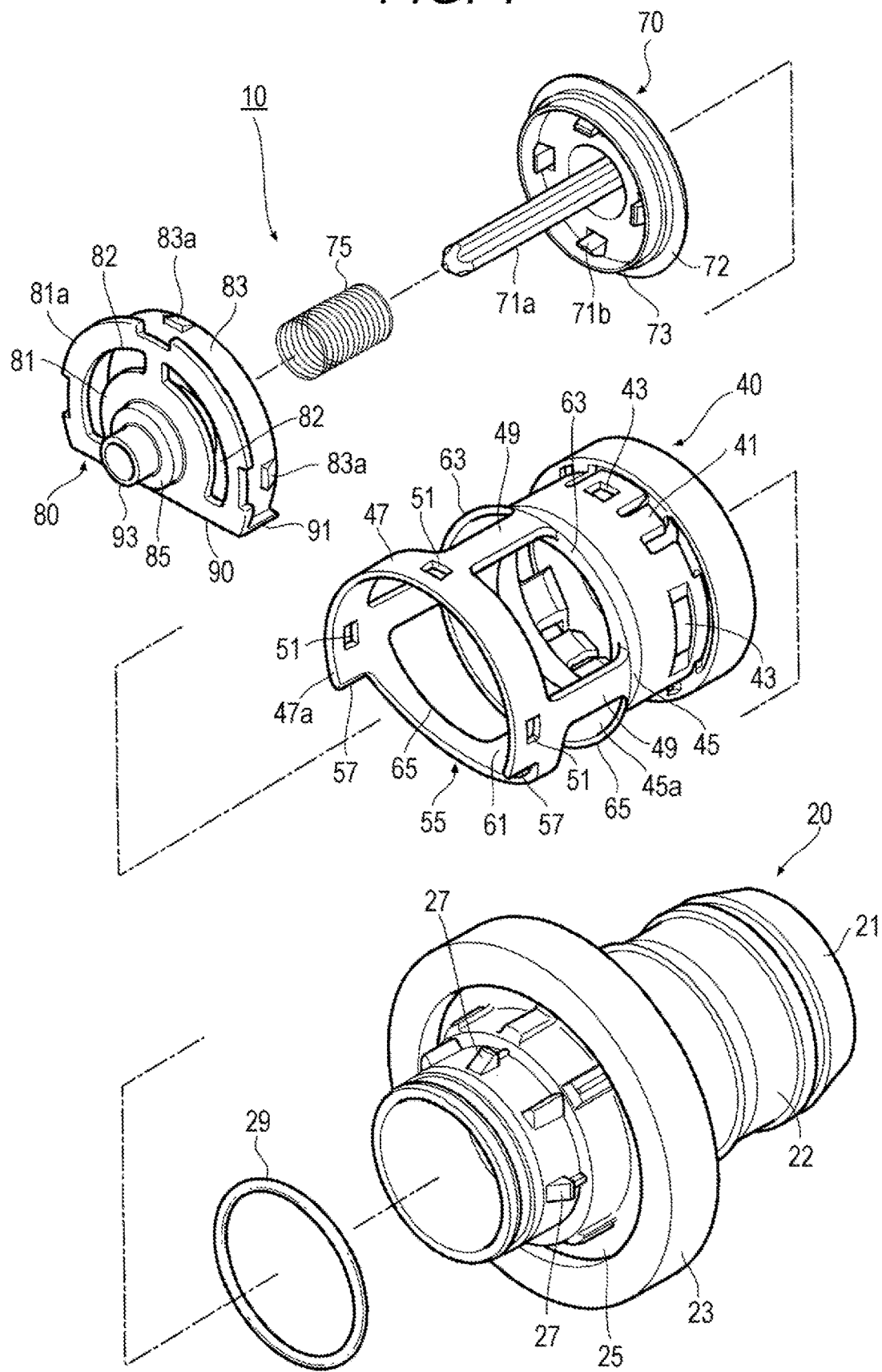
FIG. 1 is an exploded perspective view illustrating one embodiment of a fuel tank check valve according to the present invention.

As illustrated in FIG. 1, the check valve 10 of this embodiment mainly includes a body tube 20 whose inside forms a fuel passage for fuel supply, a valve element housing 40 (hereinafter referred to simply as the "housing 40") attached to the tip end side of the body tube 20 positioned on the downstream side and having a valve seat 45a (see FIG. 7), a valve element 70 slidably housed in the housing 40, a cap 80 assembled to the tip end side of the housing 40, and a spring 75 biasing the valve element 70.

Figure 7:
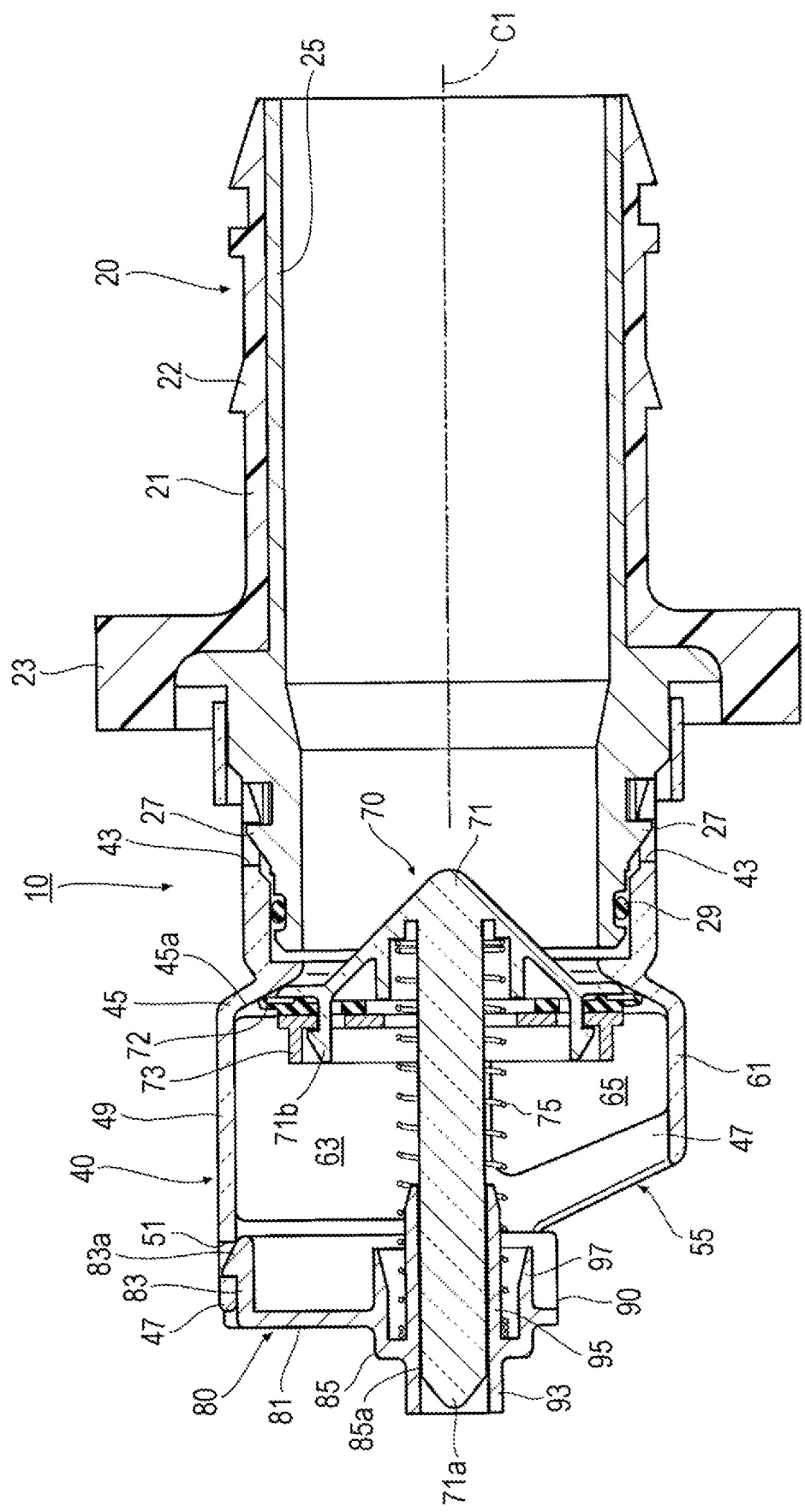
FIG. 7 is a cross-sectional view of the check valve.

As illustrated in FIG. 7, the body tube 20 includes a tank attacher 21 having a connection portion 22 having a substantially cylindrical shape and a flange 23 provided on the tip end outer periphery of the connection portion 22, and a tubular body 25 having a substantially cylindrical shape, fixed to inside the tank attacher 21. The tip end side (opposite side of the oil supply port) of the supply pipe 5 is externally mounted on the outer periphery of the connection portion 22, and the flange 23 is attached to the front side peripheral edge of an attaching hole 3 of the fuel tank 1 by welding or the like (see FIG. 10). Furthermore, a seal ring 29 is to be mounted on the tip end side of the tubular body 25 positioned on the downstream side, and a plurality of engagement claws 27 is provided in a projecting manner at a position of the tubular body 25 closer to the base end than a seal ring mounting position.

As illustrated in FIG. 1 and FIG. 7, the valve element 70 in this embodiment includes an umbrella-shaped valve body 71, an annular seal 72 made of an elastic material such as rubber, and a holding member 73 holding the seal 72 between the holding member 73 and the valve body 71. As illustrated in FIG. 7, the valve body 71 has an umbrella shape in which the front surface center on the upstream side is raised, a shaft 71a having a cross-shaped cross section is extended from the rear surface center, and a plurality of locking pieces 71b is provided in a projecting manner from the rear surface peripheral edge of the valve body 71. The valve element 70 is to be configured by sandwiching the seal 72 between the peripheral edge part of the valve body 71 and the holding member 73 and locking the locking piece 71b of the valve body 71 to the holding member 73.

Furthermore, the shaft 71a is inserted into the spring 75, and one axial end of the spring 75 abuts against the downstream side rear surface of the valve body 71 and is supported (see FIG. 7). It is to be noted that the other axial end of the spring 75 is supported by the cap 80. The valve element 70 is biased from the downstream side in the fuel supply direction by the spring 75, and the seal 72 comes into contact with and separates from the valve seat 45a (see FIG. 7) to be described later provided on a base end side frame 45 of the housing 40 to open and close a downstream side opening of the housing 40.

The valve element may have, for example, a shape in which a plurality of guide projections extends from the front surface of the valve body or may have a structure in which the valve element and the seal are not separate but are provided integrally, and the shape and the structure are not particularly limited as long as the valve element is housed in the valve element housing slidably with respect to the axial direction of the body tube and has a seal that comes in contact with and separates from the valve seat.

Next, the housing 40 will be described with reference to FIG. 1, FIG. 3, FIG. 7, and the like. The housing 40 in this embodiment is formed of a substantially cylindrical engagement tube part 41 externally mounted on the tubular body 25 of the body tube 20 on the upstream side in the fuel supply direction, and a frame-shaped part that is connect consecutively on the downstream side of the engagement tube part 41.

A plurality of engagement holes 43 is formed in the engagement tube part 41. Then, the engagement tube part 41 is mounted on the outer periphery of the tubular body 25 by arranging the engagement tube part 41 on the outer periphery of the tubular body 25 constituting the body tube 20, and engaging the plurality of engagement claws 27 of the tubular body 25 with the plurality of engagement holes 43 of the engagement tube part 41.

The tip end side positioned on the downstream side of the engagement tube part 41 is provided with the annular base end side frame 45 having a shape gradually expanding in diameter toward the axial tip end of the body tube 20. As illustrated in FIG. 7 and FIG. 10, the inner periphery (inner periphery on the downstream side) of the base end side frame 45 forms the valve seat 45a where the seal 72 of the valve element 70 comes into contact and separates.

Furthermore, an annular tip end side frame 47 to which the cap 80 is mounted is arranged on the tip end side relative to the base end side frame 45. Then, the base end side frame 45 and the tip end side frame 47 extend in a band-like manner along the axial direction of the housing 40, and are coupled in the axial direction of the housing 40 via a plurality of first coupling frames 49 arranged at predetermined intervals in the circumferential direction of the housing 40, thereby configuring a substantially cylindrical frame-shaped housing 40 coupled in the axial direction of the housing 40 and having a plurality of circumferentially provided opening windows 63 and 65.

It is to be noted that the plurality of first coupling frames 49 in this embodiment includes three of the first coupling frames 49, in which two of them are arranged at positions facing each other in the circumferential direction of the housing 40 and one of them is arranged between the two of them, and these first coupling frames are arranged at equal intervals in the circumferential direction of the housing 40. A locking hole 51 is formed in the tip end side frame 47 at each position matching the plurality of first coupling frames 49.

The housing 40 is provided with a retraction portion 55 having a shape in which a circumferential part of the retraction portion 55 is retracted from a tip end surface 47a on the downstream side of the tip end side frame 47 to the base end side frame 45 side on the upstream side.

Figure 3A:
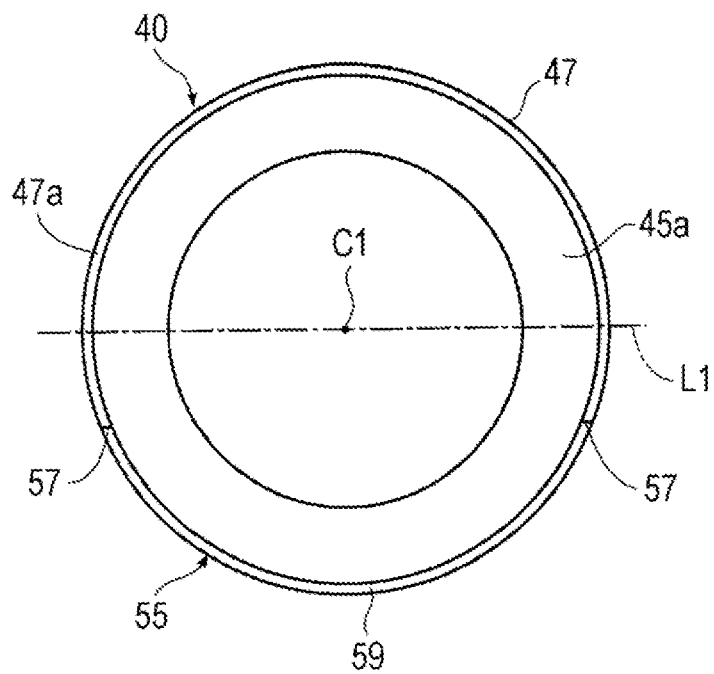
FIGS. 3A and 3B illustrate a valve element housing constituting the check valve, where
Figure 3B:
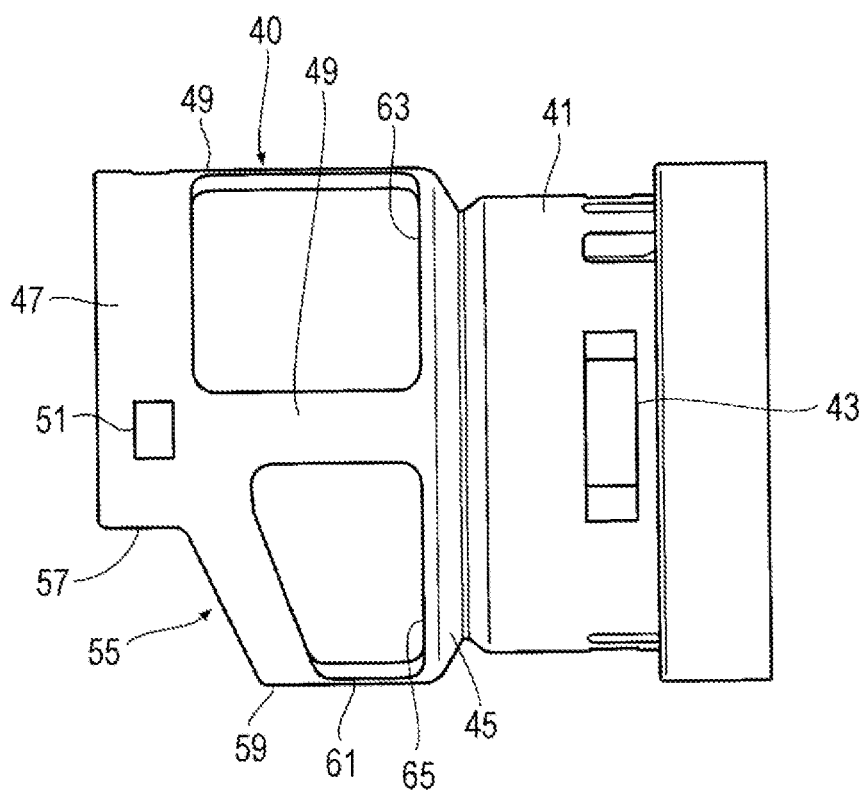

As illustrated in FIG. 3A, the retraction portion 55 in this embodiment has a shape retracted toward the base end side frame 45 as illustrated in FIG. 3B from a position going beyond half in the circumferential direction of the tip end surface 47a of the tip end side frame 47 when the housing 40 is viewed from the axial tip end side, i.e., a position going beyond a predetermined length of a straight line L1 passing through a shaft center C1 of the housing 40 and connecting two positions circumferentially facing each other.

The both tip end side ends of the retraction portion 55, i.e., both circumferential ends of the part where the retracting operation to the base end side frame 45 side starts are provided with axial steps 57 and 57, respectively, extending in the axial direction (direction along the shaft center C1) of the housing 40 toward the base end side frame 45. As illustrated in FIG. 3A, the axial steps 57 and 57 are arranged so as to be parallel to the straight line L1 when the housing 40 is viewed from the axial tip end side.

Furthermore, the retraction portion 55 has a shape gradually retracted toward the base end side frame 45 side while curving in a curved shape from the extending direction end (end on the base end side frame 45 side) of the axial steps 57 and 57 (see FIGS. 1 and 2), and a part 59 (hereinafter also referred to as "most retraction portion 59") of the retraction portion 55 most retracted to the base end side frame 45 side is to be arranged at a position orthogonal to the straight line L1 when the valve element housing 40 is viewed from the axial tip end side, as illustrated in FIG. 3A.

Figure 2:
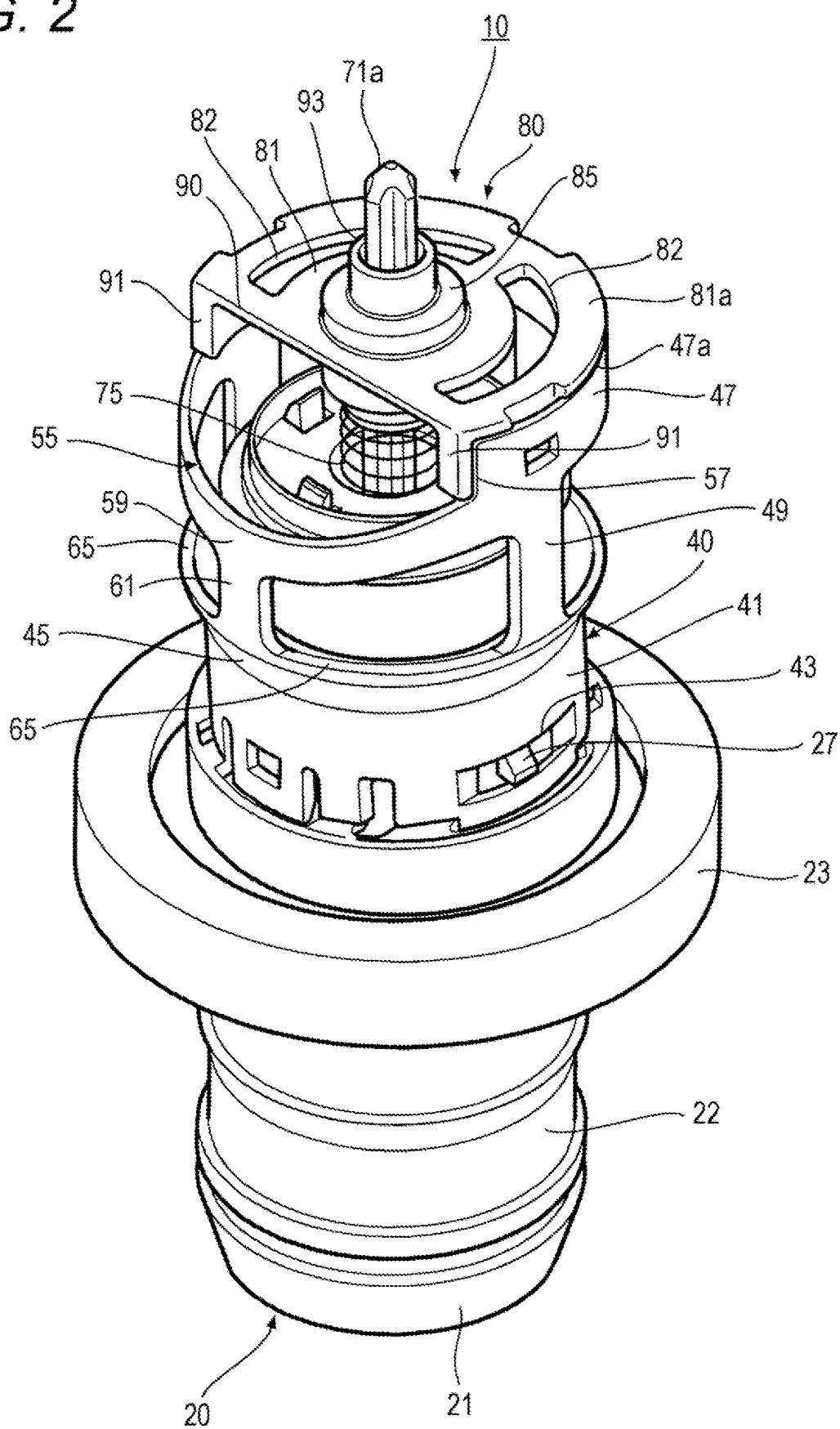
FIG. 2 is a perspective view of a state in which the check valve is assembled.
Figure 8:
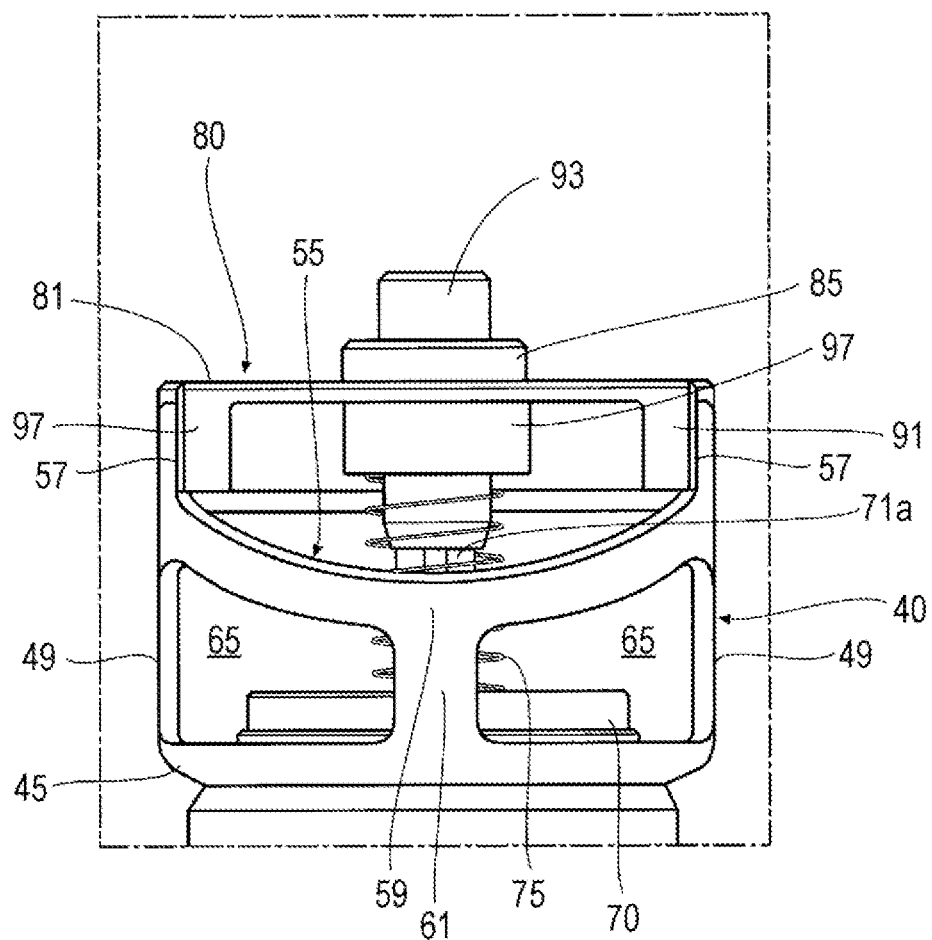
FIG. 8 is an enlarged explanatory view of the check valve in a state where the valve element is closed.
Figure 9:
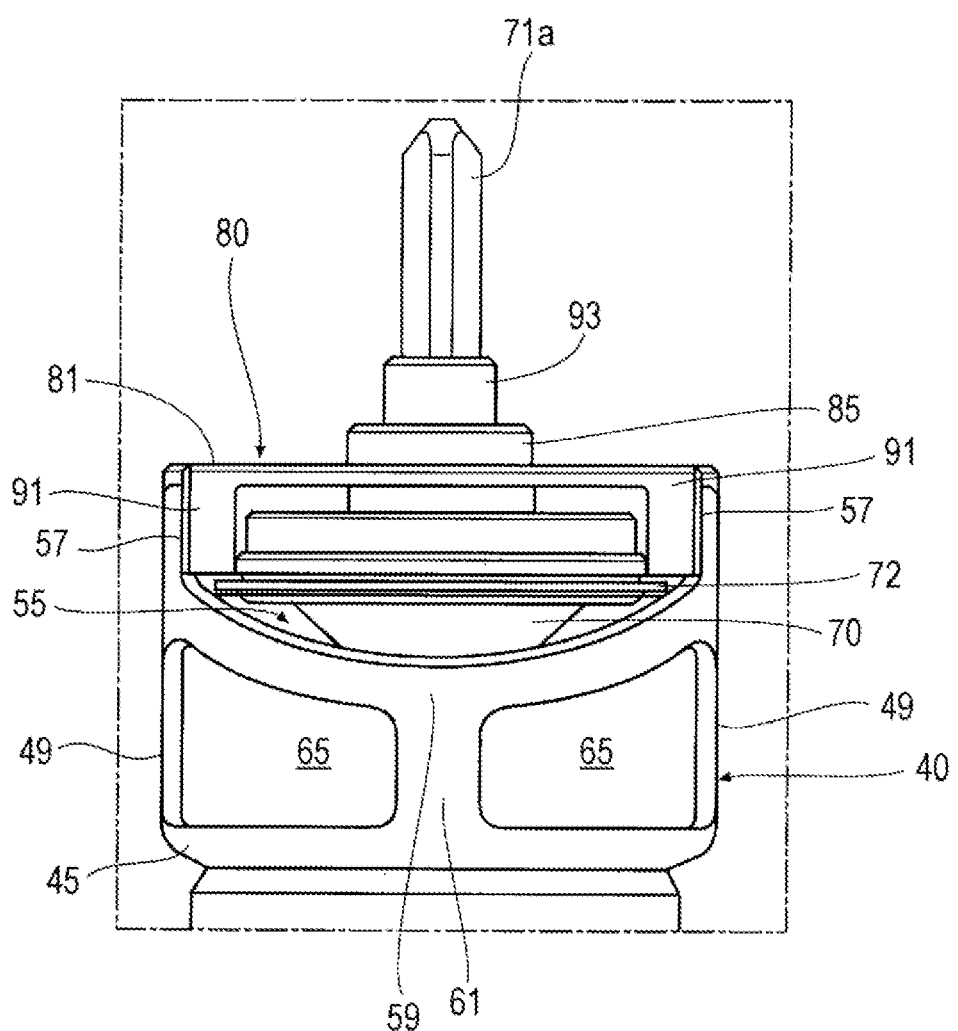
FIG. 9 is an enlarged explanatory view of the check valve in a state where the valve element is fully opened.

As illustrated in FIGS. 2, 8, and 9, the most retraction portion 59 of the retraction portion 55 provided in the tip end side frame 47 and the base end side frame 45 extend in a band-like shape along the axial direction of the valve element housing 40, and are axially coupled by a second coupling frame 61 having a length shorter than that of the first coupling frame 49. The second coupling frame 61 is arranged at a position of the housing 40 circumferentially facing one of the plurality of first coupling frames 49 (see FIG. 1).

It is to be noted that as illustrated in FIG. 1, the opening window 63, provided so as to be surrounded by the base end side frame 45, the frame part of the tip end side frame 47 other than the retraction portion 55, and the plurality of first coupling frames 49, has a substantially rectangular shape formed along the circumferential direction of the housing 40. On the other hand, as illustrated in FIG. 2, the opening window 65, provided so as to be surrounded by the base end side frame 45, the retraction portion 55 of the tip end side frame 47, the first coupling frame 49, and the second coupling frame 61, is formed so that the first coupling frame 49 side is wide and the second coupling frame 61 side is narrow, and has the opening area smaller than that of the opening window 63.

The retraction portion 55 has the following configuration in relation to the valve element 70. That is, as illustrated in FIGS. 7 and 8, the retraction portion 55 is configured so that fuel is supplied from a state in which the valve element 70 is closed (state in which the seal 72 of the valve element 70 abuts against the valve seat 45a), the valve element 70 is pressed against the biasing force of the spring 75, and when the valve element 70 is fully opened as illustrated in FIG. 9, the seal 72 of the valve element 70 is positioned on the tip end side relative to the retraction portion 55. It is to be noted that "when the valve element is fully opened" in the present invention refers to when the valve element 70 slides on the downstream side so that the seal 72 of the valve element 70 is positioned at a maximum distance from the valve seat 45a.

The retraction portion 55 in this embodiment has the axial steps 57 and 57 at both tip end side ends, and has a shape curving via the axial step 57 and retracted toward the base end side frame 45, but is not limited to this shape. For example, without being provided with the axial step, the retraction portion may have a shape retracted from both tip end side ends of the tip end side frame to the base end side frame side while directly curving, or a shape retracted to the base end side frame side while being tapered when viewed from the housing side. That is, the retraction portion is only required to have a shape retracted toward the base end side frame side from a circumferential part of the tip end surface of the tip end side frame when viewed from housing side.

Although the valve element housing 40 in this embodiment is a separate member from the body tube 20, it may be provided integrally with the body tube 20 on the tip end side of the body tube 20, for example.

The cap 80 is to be mounted to the tip end side frame 47 of the housing 40 having the above-described structure. As illustrated in FIGS. 1 and 2, the cap 80 of this embodiment has a lid 81 arranged so as to cover a tip end side opening of the tip end side frame 47, and an insertion 83 extending from the peripheral edge of the inner surface (surface on the upstream side) of the lid 81 and inserted inside the tip end side frame 47.

As illustrated in FIG. 1, a raised portion 85 having a substantially circular platform shape is provided from the outer surface (surface on the downstream side) side of the lid 81. The raised portion 85 is provided with a shaft support hole 85a matching the shaft center C1 of the housing 40 when the cap 80 is assembled to the tip end side of the housing 40 (see FIG. 7).

Figure 4A:
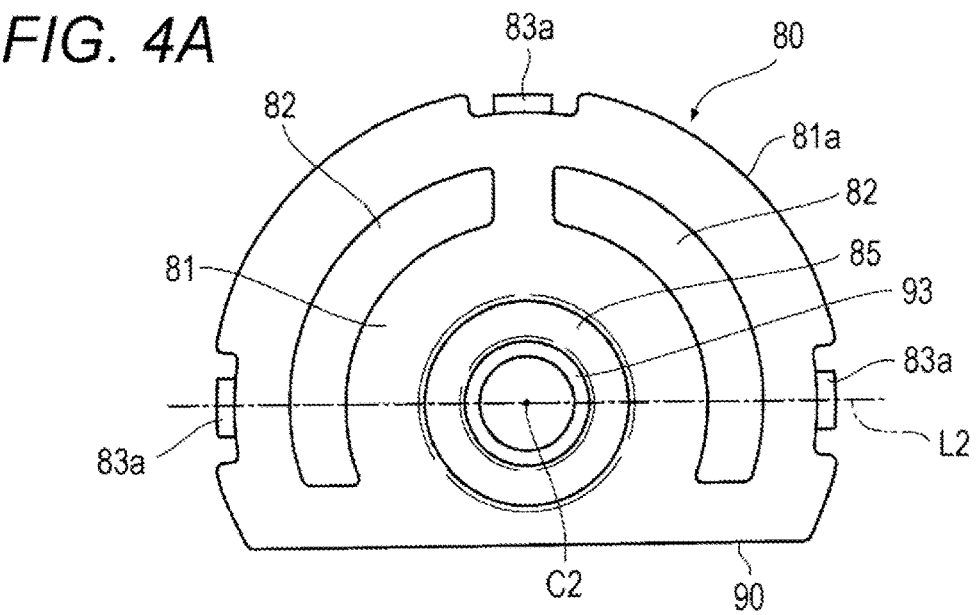
FIGS. 4A to 4C illustrate a cap constituting the check valve, where
Figure 4B:
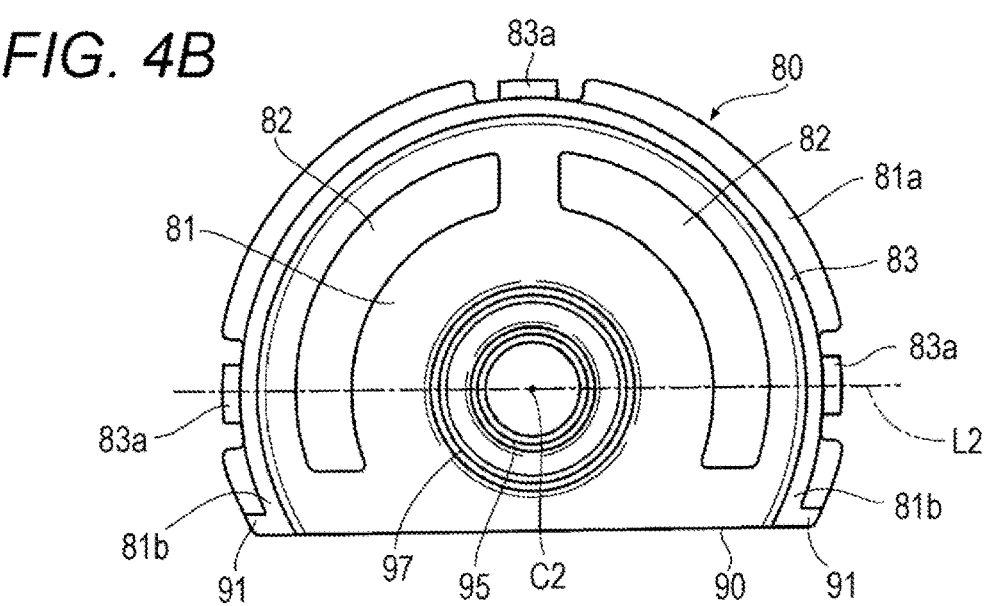

As illustrated in FIGS. 4A and 4B, the cap 80 is formed with a notch 90 in which a circumferential part of the cap 80 is notched corresponding to the retraction portion 55 provided in the tip end side frame 47 of the housing 40. The notch 90 in this embodiment is provided by cutting, with flat plane parallel to a straight line L2, a position exceeding a predetermined length of the straight line L2 passing through a center C2 of the shaft support hole 85a and connecting two positions circumferentially facing each other, of the lid 81 and the insertion 83, when the cap 80 is viewed from the axial direction (see FIGS. 4A and 4B).

Figure 6:
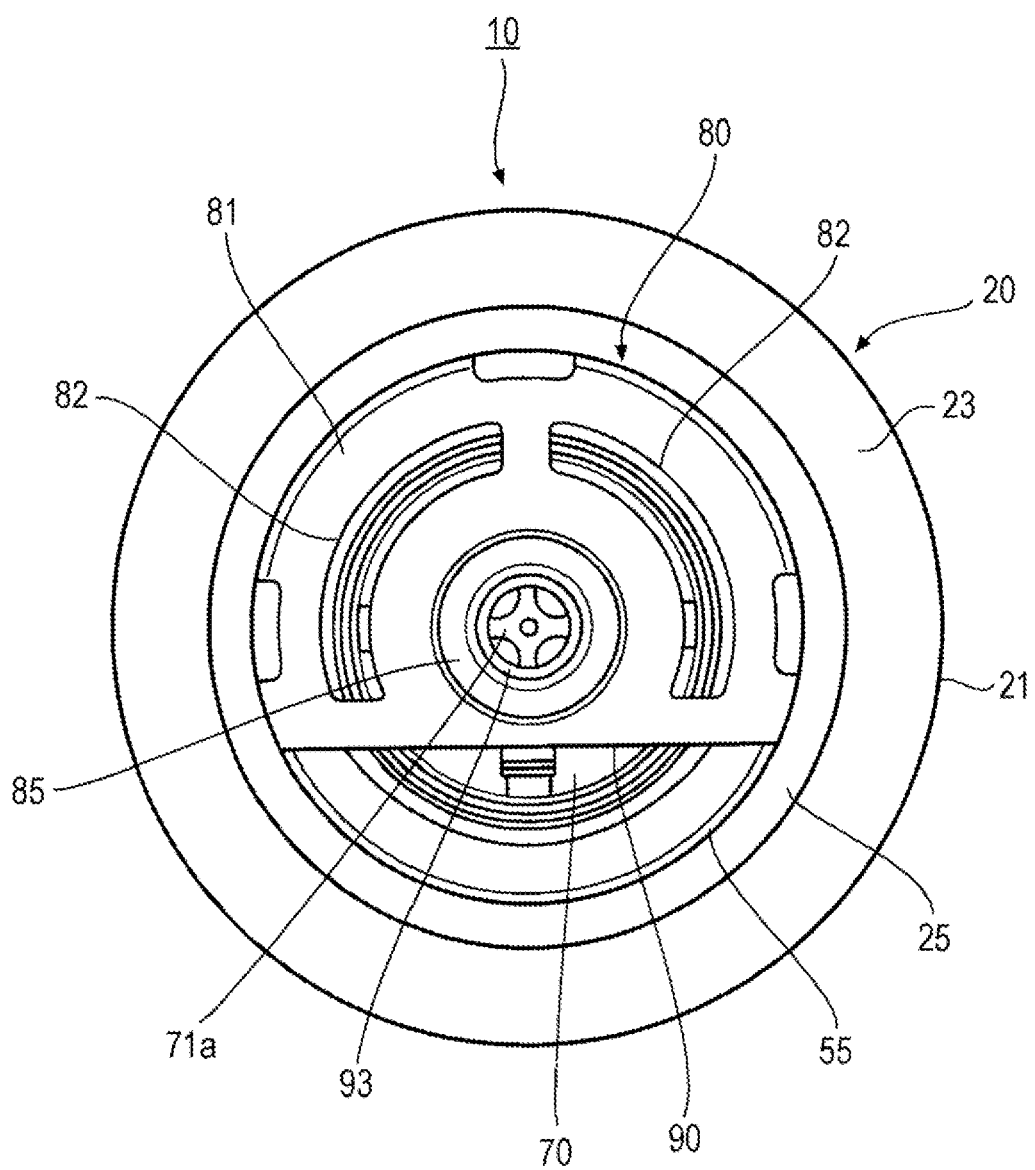
FIG. 6 is a front view of the check valve.

As illustrated in FIG. 2, the cap 80 is configured to be assembled to the housing 40 so that the notch 90 is positioned in the retraction portion 55 provided in the tip end side frame 47. That is, as illustrated in FIG. 6, the notch 90 of the cap 80 is positioned in the retraction portion 55 of the tip end side frame 47 when the cap 80 and the housing 40 are viewed from the axial tip end side in a state where the cap 80 is assembled to the tip end side of the housing 40.

The lid 81 is formed with a pair of through holes 82 and 82 extending along the circumferential direction of the lid 81. Furthermore, as illustrated in FIGS. 1 and 4B, the insertion 83 extends from a position of an inner surface of the lid 81 slightly closer to the inner diameter side than the radially outer peripheral edge, and the peripheral edge part 81a of the lid 81 abuts against the tip end surface 47a of the tip end side frame 47 (see FIG. 2).

Locking projections 83a are provided in a projecting manner on the outer periphery of the insertion 83 at positions orthogonal to the both circumferential side parts and the notch 90. When the insertion 83 of the cap 80 is inserted into the tip end side frame 47 of the housing 40, the insertion 83 is inserted while each locking projection 83a pushes out the tip end side frame 47, and the respective locking projections 83a lock the respective locking holes 51 of the tip end side frame 47, whereby the cap 80 is mounted to the tip end side frame 47. That is, the locking hole 51 and the locking projection 83a in this embodiment form a "locking portion" provided between the valve element housing and the cap in the present invention. It is to be noted that the locking portion is not particularly limited, and for example, a locking hole may be provided on the cap side and a locking projection locking with the locking hole may be provided on the housing side, or locking claws may be provided on both members to lock each other.

Figure 4C:
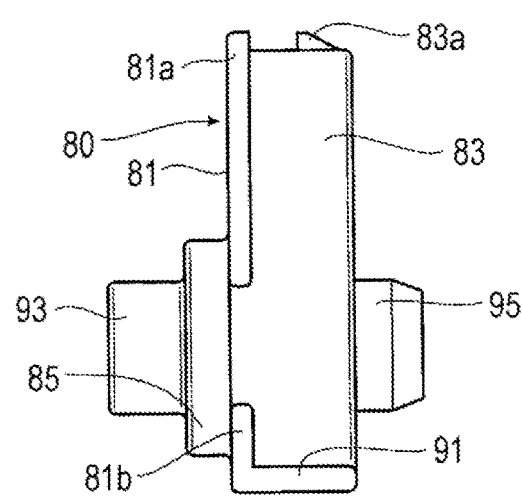
Figure 5:
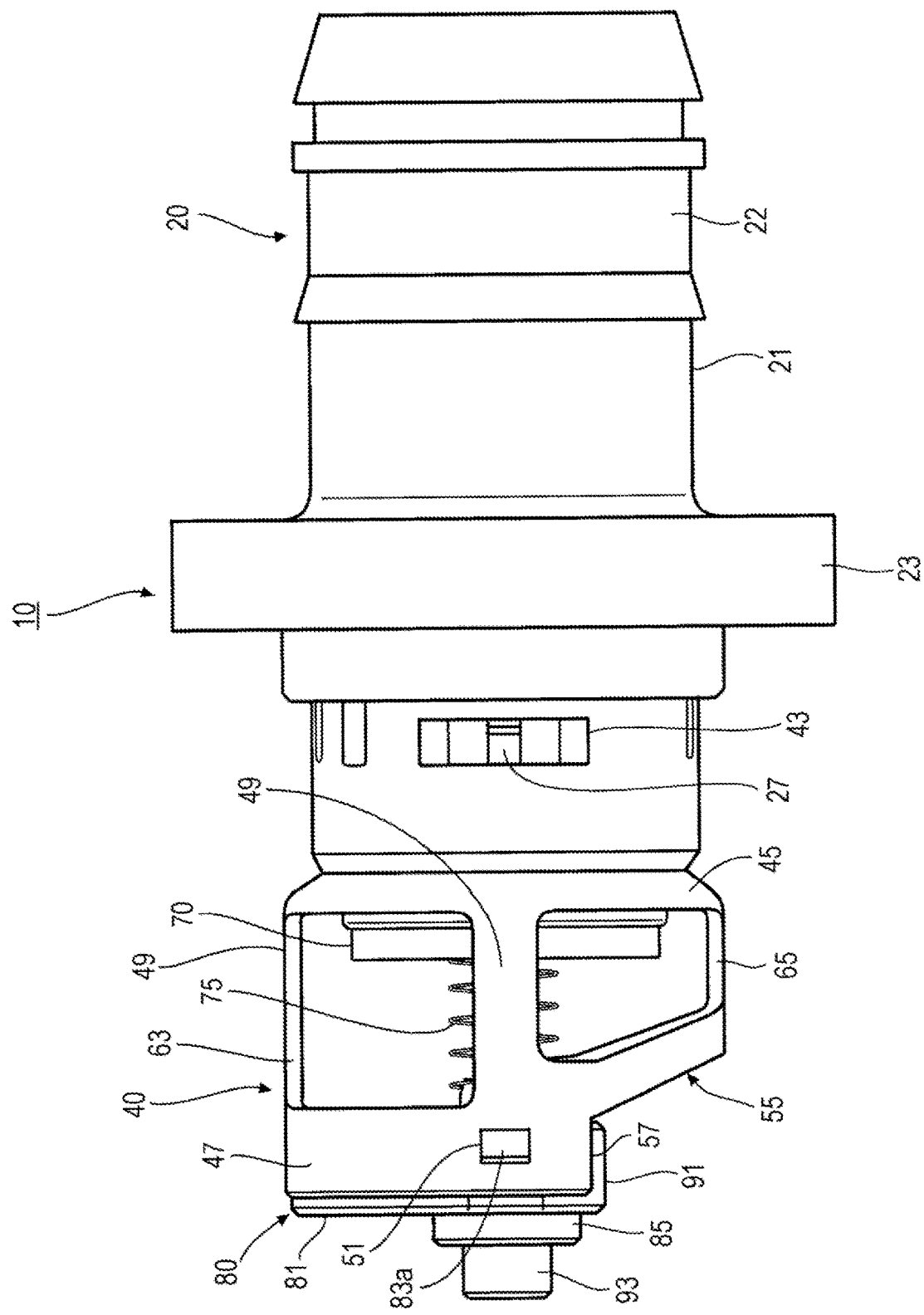
FIG. 5 is a side view of the check valve.

As illustrated in FIGS. 1 and 4B, both sides of the notch 90 are respectively provided with abutting ribs 91 and 91 abutting against the axial steps 57 and 57 of the tip end side frame 47 provided in the housing 40. The abutting ribs 91 in this embodiment extend in the form of rib along the axial direction of the insertion 83 from a part 81b positioned on both circumferential sides of the notch 90 side, i.e., the peripheral edge part 81a of the lid 81 on both circumferential side parts on the notch 90 side. It is to be noted that as illustrated in FIG. 4C, the abutting rib 91 has a substantially L-shape together with the part 81b of the peripheral edge part 81a of the lid 81, when the cap 80 is viewed from the side. As illustrated in FIG. 2, the pair of abutting ribs 91 and 91 is to abut against the pair of axial steps 57 and 57 of the tip end side frame 47, respectively, when the cap 80 is mounted to the housing 40 so that the notch 90 is positioned in the retraction portion 55 provided in the tip end side frame 47.

As illustrated in FIG. 7, an outer tubular portion 93 is provided in a projecting manner from the outer peripheral edge of the shaft support hole 85a provided in the raised portion 85 of the lid 81, and an inner tubular portion 95 is provided in a projecting manner from the inner peripheral edge of the shaft support hole 85a. The shaft 71a of the valve element 70 is axially slidably inserted into the outer tubular portion 93 and the inner tubular portion 95 to guide the axial slide of the valve element 70. It is to be noted that the outer tubular portion 93 also serves as a part to be held with a finger when the cap 80 is assembled to the housing 40.

Furthermore, as illustrated in FIGS. 4B and 7, a concentric spring support wall 97 is provided in a projecting manner on the inner surface side of the raised portion 85 and on the outer periphery of the inner tubular portion 95. The spring 75 biasing the valve element 70 is inserted between the spring support wall 97 and the inner tubular portion 95, thereby supporting the other axial end of the spring 75.

It is to be noted that although the notch 90 of the cap 80 in this embodiment has a shape matching the retraction portion 55 of the housing 40, the notch is not particularly limited as long as it has a shape positioned in the retraction portion when the cap is mounted to the housing. Furthermore, although the cap 80 of this embodiment has the tubular portions 93 and 95 supporting the shaft 71a of the valve element 70 in a sliding manner, the cap 80 may have a configuration in which, for example, a shaft extending with a predetermined length is provided on the cap side and a tubular shaft supporter supporting the shaft in a sliding manner is provided on the valve element side.

Next, the operations and effects of the check valve 10 of the present invention having the above configuration will be described.

First, the assembly process of the check valve 10 will be described. That is, the housing 40 is mounted on the outer periphery of the tubular body 25 by arranging the engagement tube part 41 of the housing 40 on the outer periphery of the tubular body 25 on which the seal ring 29 is mounted, and by engaging the plurality of engagement claws 27 of the tubular body 25 with the plurality of engagement holes 43 of the engagement tube part 41. Thereafter, the other end of the spring 75 is inserted between the spring support wall 97 and the inner tubular portion 95 of the cap 80 to support the spring 75, and the shaft 71a of the valve element 70 is inserted from one end side of the spring 75, and the shaft 71a is inserted into the inner tubular portion 95 of the cap 80, thereby arranging the spring 75 between the cap 80 and the valve element 70.

Thereafter, the notch 90 of the cap 80 is positioned in the retraction portion 55 of the tip end side frame 47 while holding the cap 80 with a finger by using the notch 90, the outer tubular portion 93, and the like and also holding the valve element 70 to maintain the state (state in which the spring 75 is arranged between the cap 80 and the valve element 70), thereby causing the abutting ribs 91 and 91 of the cap 80 to abut against the axial steps 57 and 57 of the tip end side frame 47. Then, the rotation of the cap 80 is restricted with respect to the housing 40, and the corresponding locking projection 83a of the cap 80 is aligned with each locking hole 51 of the tip end side frame 47.

In this state, the cap 80 is pushed into the housing 40. Then, the insertion 83 of the cap 80 is inserted into the inside of the tip end side frame 47, the locking projection 83a pushes out the tip end side frame 47 from the inside, and the insertion 83 is deeply inserted, and when the locking projection 83a enters the locking hole 51, the tip end side frame 47 elastically returns, and the locking projection 83a locks on the inner periphery of the locking hole 51, and hence the cap 80 is mounted on the tip end side frame 47, thereby allowing the cap 80 to be assembled to the housing 40.

Thus, in the check valve 10, the cap 80 can be assembled to the housing 40 by positioning the notch 90 of the cap 80 in the retraction portion 55 of the housing 40 and locking the cap 80 to the housing 40 by the locking portion (here, the locking hole 51 and the locking projection 83a). As a result, the cap 80 can be easily aligned in the circumferential direction of the tip end side frame 47 of the housing 40, and the assembling workability of the cap 80 to the housing 40 can be improved.

The retraction portion 55 is provided in the tip end side frame 47 of the housing 40, thereby allowing flexural deformation of the tip end side frame 47 to be facilitated and to be easily pushed out at the time of cap assembly. Hence, the cap 80 can be easily pushed into the housing 40, and the cap 80 can be easily assembled to the housing 40.

Furthermore, when the notch 90 of the cap 80 is held by a finger and mounted on the tip end side frame 47 of the housing 40, it is possible to prevent the finger from coming into contact with the tip end side frame 47, and it is possible to release the finger from the retraction portion 55. Hence, the assembling workability of the cap 80 to the housing 40 can be improved.

In this embodiment, as illustrated in FIGS. 1 and 2, the axially extending axial steps 57 are provided on both tip end side ends of the retraction portion 55 of the tip end side frame 47 of the housing 40, and the abutting ribs 91 abutting against the axial steps 57 are provided on both sides of the notch 90 of the cap 80. As a result, the cap 80 can be assembled to the housing 40 by causing the abutting rib 91 of the cap 80 to abut against the axial step 57 of the housing 40, and the cap 80 can be easily assembled to the housing 40 in a state of restricting rotation.

Furthermore, in this embodiment, as illustrated in FIGS. 2, 8, and 9, the most retraction portion 59 of the tip end side frame 47 of the housing 40 and the base end side frame 45 are axially coupled by the second coupling frame 61 having a length shorter than that of the first coupling frame 49. Hence, the rigidity of the tip end side frame 47, which is easily deformed by the retraction portion 55, can be increased within a range that does not hinder the assembling workability of the cap 80.

As illustrated in FIG. 10, the check valve 10 is attached to the fuel tank 1 in a state where the valve element 70 and the cap 80 side face the downstream side in the fuel supply direction by using the tank attacher 21 of the body tube 20. At this time, the check valve 10 is to be attached to the fuel tank 1 with the retraction portion 55 of the housing 40 and the notch 90 of the cap 80 facing downward.

Then, when fuel is supplied from an oil supply port (not illustrated) and the fuel is supplied into the supply pipe 5, the fuel passes through the fuel passage in the body tube 20 and collides with the umbrella-shaped valve body 71 of the valve element 70. Then, due to the pressure of the fuel, the valve element 70 slides downstream against the biasing force of the spring 75, and the seal 72 separates from the valve seat 45a. As a result, the fuel flows into the housing 40, and flows into the fuel tank 1 through the opening window 65 of the housing 40 and the tip end opening side of the retraction portion 55 of the tip end side frame 47 (see FIG. 10).

Thereafter, when the fuel supply is completed, the valve element 70 slides upstream by the biasing force of the spring 75, and the valve element 70 and the seal 72 abut against the valve seat 45a, thereby blocking the fuel passage (see FIG. 7). This prevents the fuel from flowing back through the supply pipe 5 due to the pressure in the fuel tank 1, and prevents the fuel vapor and the fuel itself from flowing out also when the fuel is not being supplied.

In this embodiment, as illustrated in FIG. 9, when the valve element 70 is fully opened, the seal 72 of the valve element 70 is positioned on the tip end side relative to the retraction portion 55. Therefore, as described above, when the fuel supplied through the supply pipe 5 flows in the body tube 20, opens the valve element 70 against the biasing force of the spring 75, and is supplied into the fuel tank 1, it is possible to cause the fuel to easily flow out from a gap between the retraction portion 55 and the seal 72 of the valve element 70, and it is possible to cause the fuel to smoothly flow out by reducing the outflow resistance of the fuel.

FIGS. 11 to 16 illustrate another embodiment of the fuel tank check valve according to the present invention. It is to be noted that substantially the identical parts to those of the embodiment described above are given the same reference numerals, and description thereof will be omitted.

A fuel tank check valve 10A (hereinafter also referred to as the "check valve 10A") of this embodiment has a valve element housing 40A (hereinafter referred to simply as the "housing 40A") of the body tube 20 and a cap 80A assembled to the tip end side (downstream side in the fuel supply direction) of the housing 40A, each of which is different in shape. It is to be noted that in FIGS. 11, 12, and 15, the body tube 20 is omitted for the sake of convenience in order to enlarge the housing 40A and the cap 80A for easy understanding.

Figure 16:
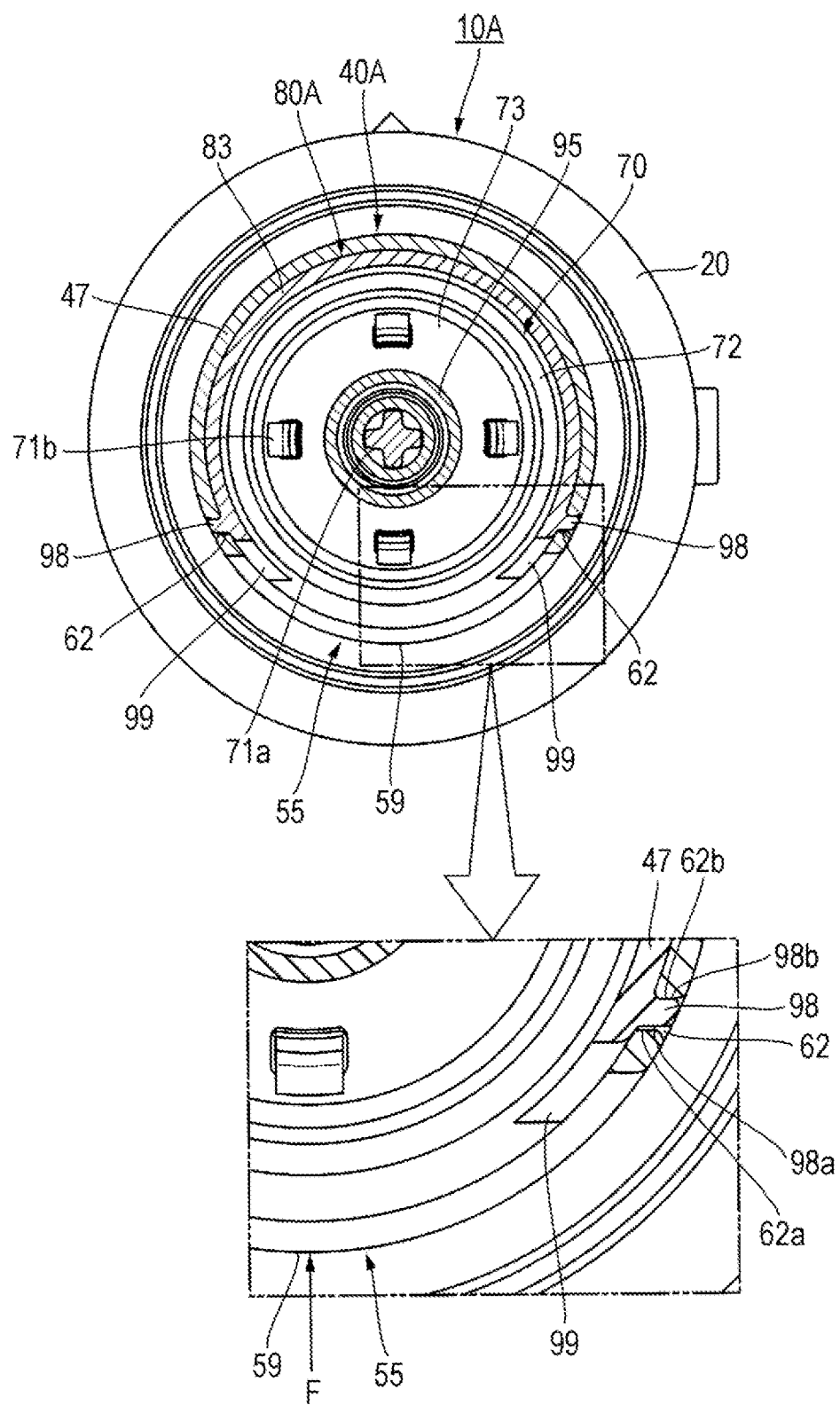
FIG. 16 is a cross-sectional view taken along the arrow line A-A of FIG. 15.

In the check valve 10A of this embodiment, as illustrated in FIG. 16, both tip end side ends of the retraction portion 55 of the housing 40A are respectively provided with abutting portions abutting against the end surface on the retraction portion 55 side on the both sides of the notch 90 of the cap 80A, when the body tube 20 is viewed from the axial tip end side.

Figure 11:
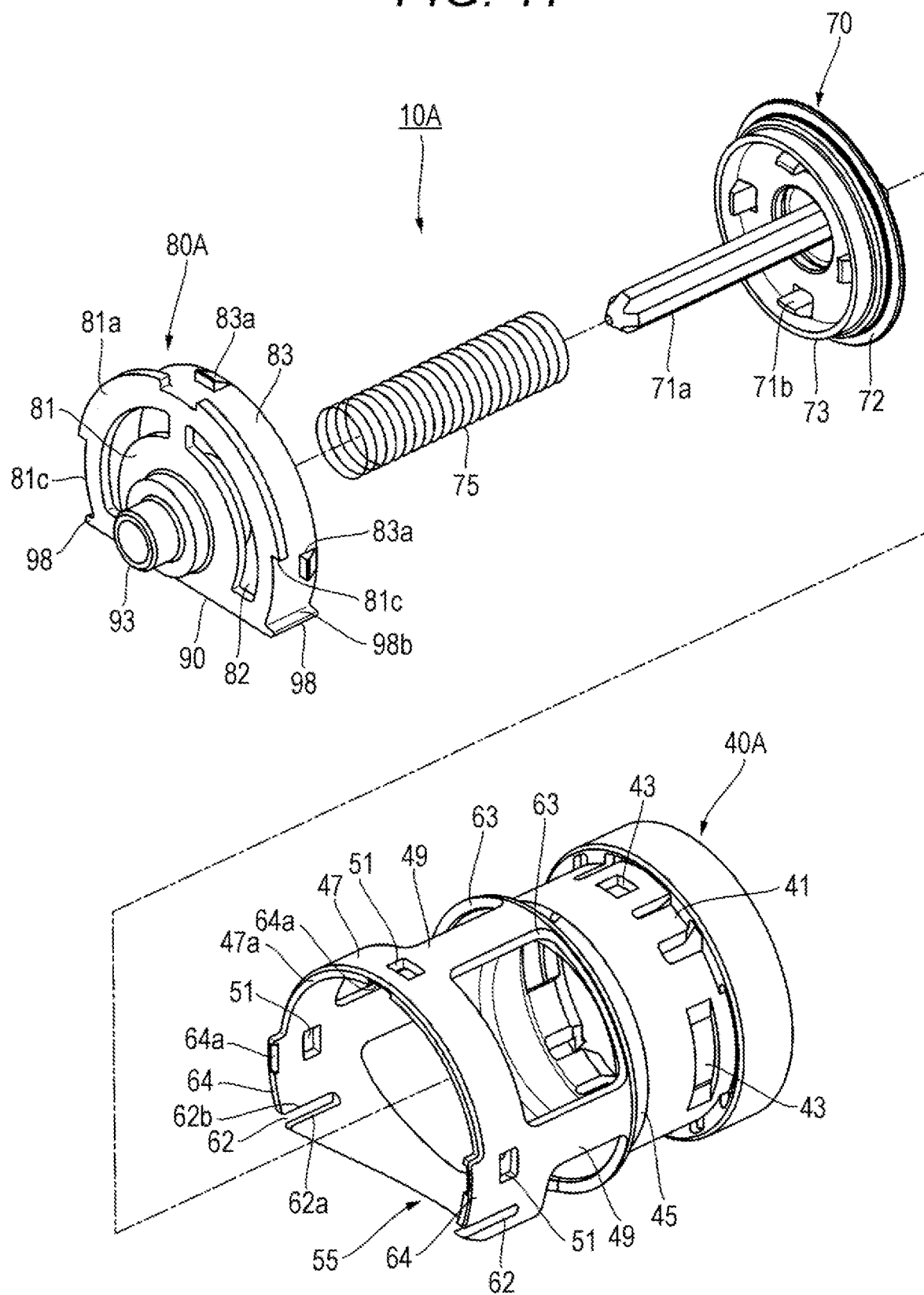
FIG. 11 is an exploded perspective view illustrating another embodiment of the fuel tank check valve according to the present invention.
Figure 13A:
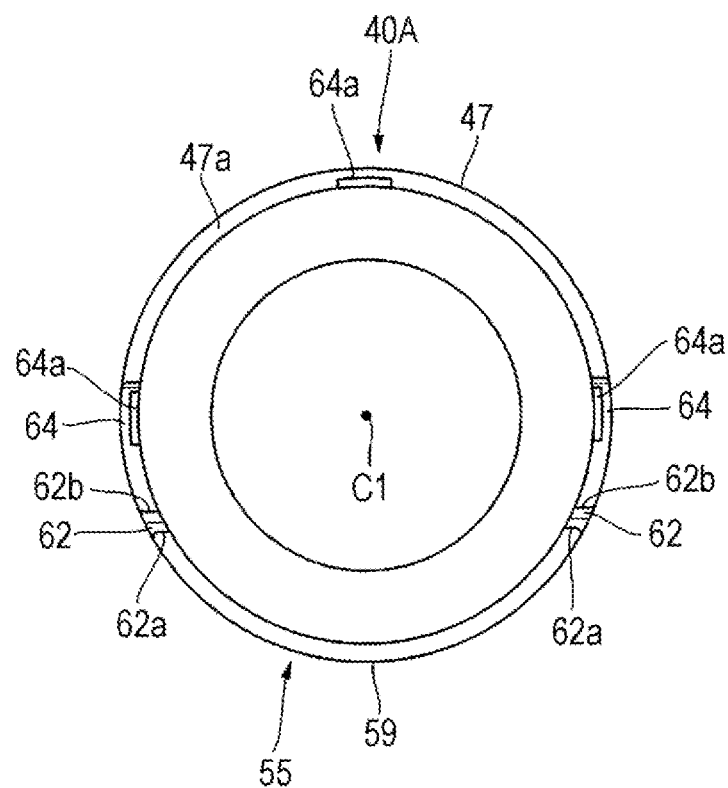
FIGS. 13A and 13B illustrate the valve element housing constituting the check valve, where
Figure 13B:
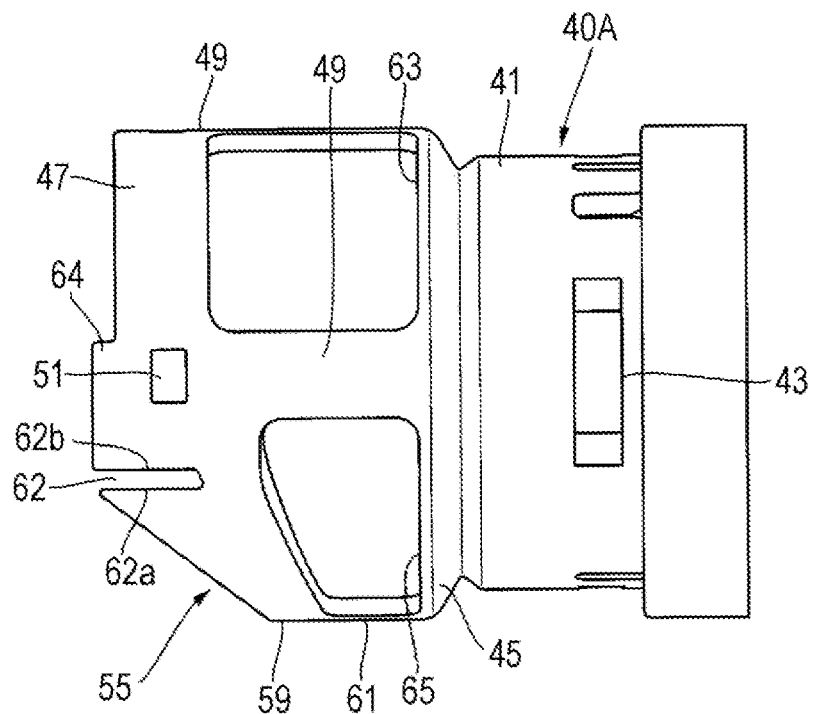

More specifically, as illustrated in FIGS. 11, 13A, and 13B, slits 62 and 62 extending in the axial direction (direction along the shaft center C1) of the housing 40A toward the base end side frame 45 are formed respectively in the housing 40A at the both tip end side ends of the retraction portion 55 of the housing 40A, i.e., both circumferential ends of the part where the retracting operation to the base end side frame 45 side starts. The inner surface of each slit 62 on the retraction portion 55 side forms a first inner surface 62a, the inner surface facing the first inner surface 62a forms a second inner surface 62b, and the both inner surfaces 62a and 62b extend parallel to each other.

Figure 15:
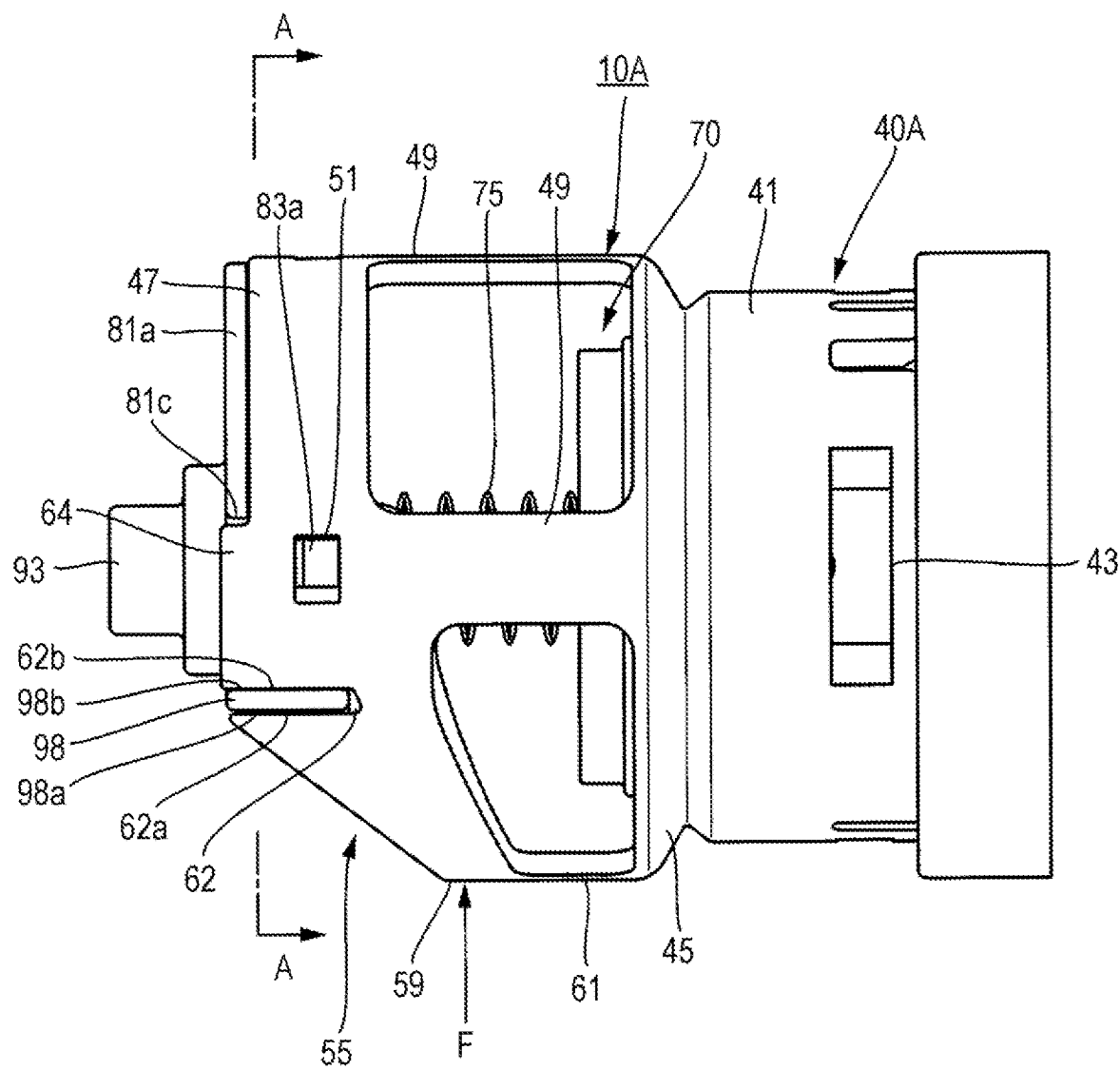
FIG. 15 is a side view of the check valve.

It is to be noted that as illustrated in FIGS. 15 and 16, a fitting rib 98 described later of the cap 80A to be is fitted into each slit 62, and at this time, a first outer surface 98a described later of the fitting rib 98 is allowed to abut against the first inner surface 62a of each slit 62, and a second outer surface 98b described later of the fitting rib 98 is allowed to abut against the second inner surface 62b of each slit 62.

Furthermore, as illustrated in FIG. 11, the housing 40A, at both circumferential ends adjacent to the pair of slits 62 and 62, is provided with projection pieces 64 and 64 projecting toward the downstream side in the fuel supply direction further than the tip end surface 47a of the tip end side frame 47. As illustrated in FIGS. 11 and 13A, a tapered surface 64a is formed, on the tip end side inner surface of each projection piece 64, on the inner surface at a position matching the locking hole 51 and a position facing the most retraction portion 59 of the tip end side frame 47. The tapered surface 64a facilitates passage of the locking projection 83a on the cap 80A side when the cap 80A is assembled to the housing 40A.

On the other hand, the fitting ribs 98 and 98 to be fitted into the slits 62 and 62 are formed on both sides of the notch 90 of the cap 80A. The fitting ribs 98 and 98 project in the direction along a surface direction L3 of the flat planar notch 90 on both circumferential sides of the notch 90 of the cap 80A (see FIG. 14A), and each extend along the axial direction of the insertion 83 (see FIG. 14B).

As illustrated in FIG. 14, the outer surface of each fitting rib 98 on the notch 90 side forms the first outer surface 98a, the outer surface on the opposite side to the first outer surface 98a forms the second outer surface 98b, and the both outer surfaces 98a and 98b are formed in parallel to each other.

Figure 12:
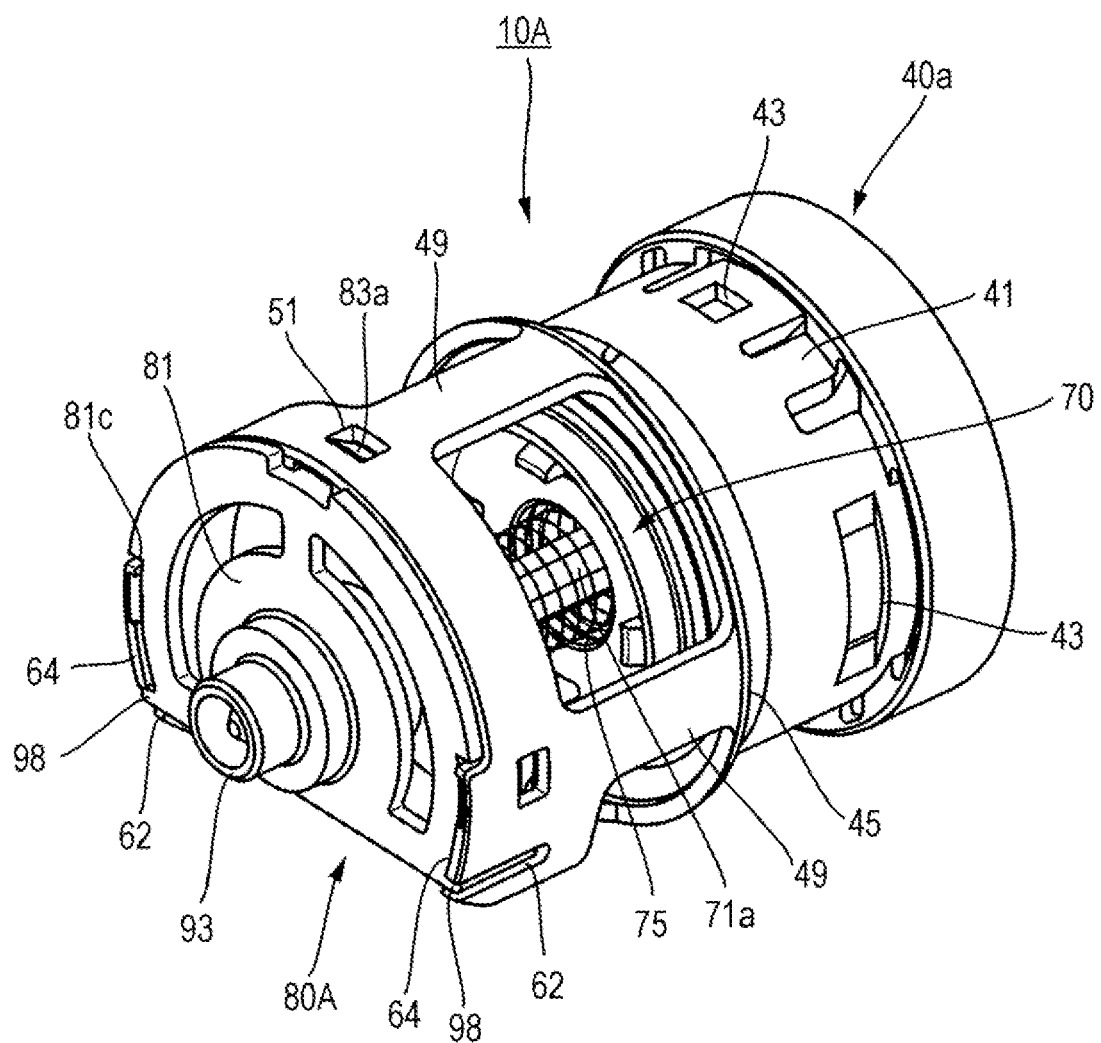
FIG. 12 is a perspective view of a state in which the check valve is assembled.

Then, as illustrated in FIGS. 12 and 15, when the cap 80A is assembled to the housing 40A, the pair of fitting ribs 98 and 98 on the cap 80A side are to be fitted into the pair of slits 62 and 62 on the housing 40A side, respectively, and hence the notch 90 is positioned in the retraction portion 55 provided on the tip end side frame 47.

As illustrated in FIGS. 15 and 16, in this cap assembly state, the first outer surface 98a of each fitting rib 98 is arranged to face the first inner surface 62a of each slit 62, and the second outer surface 98b of each fitting rib 98 is arranged to face the second inner surface 62b of each slit 62.

In this state, as illustrated in FIGS. 15 and 16, when an external force (see an arrow F) is applied to the retraction portion 55 of the housing 40A radially inward of the body tube 20, the first inner surface 62a of each slit 62 is to abut against the first outer surface 98a of each fitting rib 98. That is, in this embodiment, the first inner surface 62a of the slit 62 forms the "abutting portion" in the present invention. When the first inner surface 62a of the slit 62 abuts against the first outer surface 98a of the fitting rib 98, the second inner surface 62b of the slit 62 is to abut against the second outer surface 98b of the fitting rib 98 in the case where the cap 80A is pressed to finely move to the radially opposite side to the retraction portion 55 of the housing 40A (case of moving in the arrow F direction) or in the case where the cap 80A rotates with respect to the housing 40A.

In this embodiment, as illustrated in FIG. 16, when the body tube 20 is viewed from the axial tip end side, projections 99 extending toward the retraction portion 55 side relative to the abutting portion (here, the first inner surface 62a of the slit 62) provided on the retraction portion 55 of the housing 40A are formed from the end surface on the retraction portion 55 side on both sides of the notch 90 of the cap 80A, and these projections 99 and 99 are allowed to abut against the inner peripheral surface of the retraction portion 55.

Figure 14A:
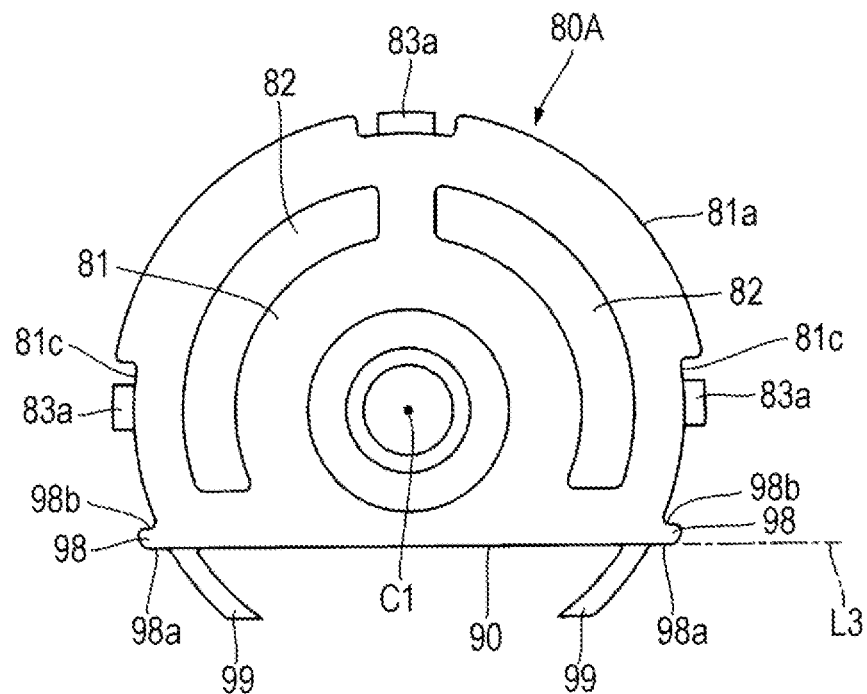
FIGS. 14A and 14B illustrate a cap constituting the check valve, where
Figure 14B:
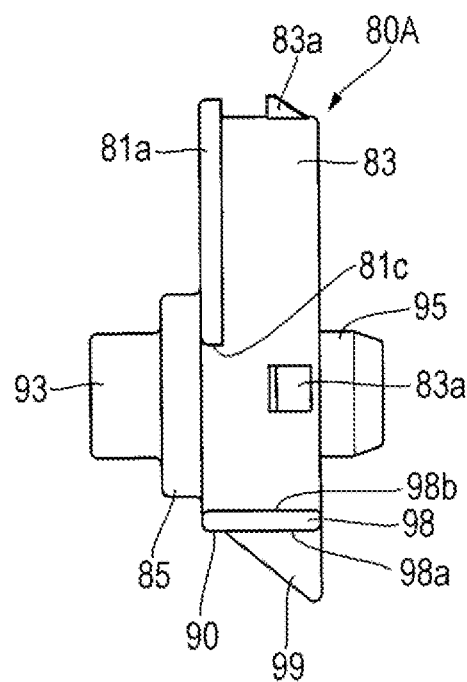

Specifically, the projections 99 and 99 extend while intersecting with the surface direction L3 of the flat surface-shaped notch 90, on both circumferential sides of the notch 90 of the cap 80A, and curving along the inner periphery of the retraction portion 55 of the housing 40A (see FIGS. 14A and 16), and form a substantially triangular projection piece shape as illustrated in FIG. 14B.

As illustrated in FIG. 16, the projections 99 and 99 are to be arranged on the inner periphery of the retraction portion 55 in the state where the pair of fitting ribs 98 and 98 on the cap 80A side are fitted into the pair of slits 62 and 62 on the housing 40A side and the cap 80A is assembled to the housing 40A. At this time, since each projection 99 is positioned on the retraction portion 55 side relative to the first inner surface 62a of the slit 62 forming the abutting portion, when an external force is applied to the retraction portion 55 of the housing 40A in the radially inward of the body tube 20 (see the arrow F), each projection 99 abuts on the retraction portion 55 side relative to the first inner surface 62a of each slit 62 forming the abutting portion.

As illustrated in FIG. 11, notches 81c and 81c, where the projection pieces 64 and 64 of the housing 40A enter, are formed on both circumferential sides of the peripheral edge part 81a of the cap 80A at positions adjacent to the pair of fitting ribs 98 and 98, which is one of the rotation restriction structures of the cap 80A with respect to the housing 40A.

Next, the operations and effects of the check valve 10A of the present invention having the above configuration will be described.

That is, in the check valve 10A, as illustrated in FIG. 16, when the body tube 20 is viewed from the axial tip end side, the both tip end side ends of the retraction portion 55 of the housing 40A are provided respectively with abutting portions (here, the first inner surface 62a of the slit 62) abutting against the end surface (here, the first outer surface 98a of the fitting rib 98) on the retraction portion 55 side on the both sides of the notch 90 of the cap 80A. Therefore, if an external force is applied to the retraction portion 55 of the housing 40A as indicated by the arrow F in FIGS. 15 and 16 due to fall of the check valve 10A, for example, when the check valve 10A is attached to the fuel tank 1 or during transportation of the check valve 10, the abutting portions (the first inner surface 62a of the slit 62) provided in the retraction portion 55 respectively abut against the end surface (the first outer surface 98a of the fitting rib 98) on the retraction portion side on both sides of the notch 90 of the cap 80A, and it is hence possible to suppress further flexural deformation of the retraction portion 55. As a result, the locking state by the locking portion (here, the locking hole 51 and the locking projection 83a) is released, it is possible to suppress the cap 80A from coming off from the housing 40A.

In this embodiment, the axially extending slits 62 and 62 are formed at both tip end side ends of the retraction portion 55 of the housing 40A, the fitting ribs 98 and 98 to be fitted into the slits 62 and 62 are formed on both sides of the notch 90 of the cap 80A, the first inner surface 62a of the slit 62 is allowed to abut against the first outer surface 98a of the fitting rib 98, the first inner surface 62a forms the abutting portion, and the second inner surface 62a of the slit 62 is allowed to abut against the second outer surface 98b of the fitting rib 98. Therefore, when the cap 80A is assembled to the housing 40A, if the fitting ribs 98 and 98 on the cap 80A side are aligned with the pair of slits 62 and 62 on the housing 40A side and the cap 80A is pushed in, the fitting ribs 98 and 98 are fitted into the pair of slits 62 and 62, respectively, and hence the first outer surface 98a of each fitting rib 98 is allowed to abut against the first inner surface 62a of each slit 62 and the second outer surface 98b of each fitting rib 98 is allowed to abut against the second inner surface 62b of each slit 62.

Therefore, even if the cap 80A is attempted to rotate, the first outer surface 98a of the fitting rib 98 abuts against the first inner surface 62a of the slit 62, or the second outer surface 98b of the fitting rib 98 abuts against the second inner surface 62b of the slit 62, thereby allowing the cap 80A to be restricted from rotating, and hence the cap 80A can be easily assembled to the housing 40A. As indicated by the arrow F in FIGS. 15 and 16, when an external force is applied to the retraction portion 55 of the housing 40A, the first inner surface 62a of the slit 62 abuts against the first outer surface 98a of the fitting rib 98, and it is hence possible to suppress the flexural deformation of the retraction portion 55. Thus, in this configuration, both the rotation restriction of the cap 80A and the flexural deformation suppression of the retraction portion 55 can be achieved by the slit 62 and the fitting rib 98.

In this embodiment, as illustrated in FIG. 16, when the body tube 20 is viewed from the axial tip end side, projections 99 extending toward the retraction portion 55 side relative to the abutting portion (the first inner surface 62a of the slit 62) provided on the retraction portion 55 of the housing 40A are formed from the end surface on the retraction portion 55 side on both sides of the notch 90 of the cap 80A, and these projections 99 and 99 are allowed to abut against the inner peripheral surface of the retraction portion 55. Therefore, as indicated by the arrow F in FIGS. 15 and 16, when an external force is applied to the retraction portion 55 of the housing 40A, the projection 99 abuts against the retraction portion 55 side relative to the abutting portion to narrow the range of the flexural deformation of the retraction portion 55, and it is hence possible to make it less likely to release the locking state by the locking portion and to more reliably suppress removal of the cap 80A from the housing 40A.

It is to be noted that the present invention is not limited to the above-described embodiments and various modified embodiments are possible within the scope of the gist of the present invention, and such embodiments are also included in the scope of the present invention.

LIST OF REFERENCE SIGNS

1 Fuel tank
5 Fuel supply pipe
10, 10A Fuel tank check valve (check valve)
20 Body tube
22 Connection portion
40, 40A Valve element housing (housing)
45 Base end side frame
45a Valve seat
47 Tip end side frame
47a Tip end surface
49 First coupling frame
55 Retraction portion
57 Axial step
61 Second coupling frame
62 Slit
62a First inner surface
62b Second inner surface
70 Valve element
72 Seal
75 Spring
80, 80A Cap
90 Notch
91 Abutting rib
98 Fitting rib
98a First outer surface
98b Second outer surface
99 Projection

The invention claimed is:

1. A fuel tank check valve provided on a downstream side of a fuel supply pipe for supplying fuel to a fuel tank, the check valve comprising:
  a body tube having a connection portion connected to the fuel supply pipe on a base end side positioned on an upstream side in a fuel supply direction, and provided with a valve element housing having a valve seat on a tip end side positioned on a downstream side in the fuel supply direction;
  a valve element housed in the valve element housing slidably with respect to an axial direction of the body tube, and having a seal coming into contact with and separating from the valve seat;
  a cap assembled on a tip end side of the valve element housing;
  a spring supported by the cap and biasing the valve element in a direction abutting against the valve seat; and
  a locking portion provided between the valve element housing and the cap, wherein
  the valve element housing has an annular base end side frame provided with the valve seat in an inner periphery, an annular tip end side frame arranged on a tip end side relative to the base end side frame and to which the cap is mounted, and a plurality of circumferentially arranged first coupling frame axially coupling the base end side frame and the tip end side frame,
  the tip end side frame is provided with a retraction portion formed in such a manner that a circumferential part is retracted to the base end side frame side from a tip end surface,
  the cap is formed with a notch whose circumferential part is notched when the body tube is viewed from the axial tip end side, and
  the cap is assembled in the valve body housing so that the notch is positioned in the retraction portion.

2. The fuel tank check valve according to claim 1, wherein
  an axially extending axial step is provided to the valve element housing at both tip end side ends of the retraction portion, and
  an abutting rib abutting against the axial step is provided to the cap on both sides of the notch.

3. The fuel tank check valve according to claim 1, wherein
  a part of the tip end side frame of the valve element housing that is retracted to a most base end side frame side and the base end side frame are axially coupled by a second coupling frame shorter than the first coupling frame.

4. The fuel tank check valve according to claim 1, wherein
  the seal of the valve element is configured to be positioned in the tip end side frame of the valve element housing, on a tip end side relative to the retraction portion, when the valve element is fully opened.

5. The fuel tank check valve according to claim 1, wherein
  when the body tube is viewed from an axial tip end side, both tip end side ends of the retraction portion of the valve element housing are provided respectively with abutting portions abutting against an end surface on a retraction portion side on both sides of the notch of the cap.

6. The fuel tank check valve according to claim 5, wherein
  an axially extending slit is formed at both tip end side ends of the retraction portion of the valve element housing, and a fitting rib to be fitted into the slit is formed at both sides of the notch of the cap,
  a first inner surface of the slit on a retraction portion side is allowed to abut against a first outer surface of the fitting rib on a notch side, and the first inner surface forms the abutting portion, and
  a second inner surface of the slit facing the first inner surface is allowed to abut against a second outer surface of the fitting rib on an opposite side to the first outer surface.

7. The fuel tank check valve claim 5, wherein
  when the body tube is viewed from an axial tip end side,
  a projection extending toward a retraction portion side relative to the abutting portion provided on a retraction portion of the valve element housing is formed from an end surface on the retraction portion side on both sides of the notch of the cap, and the projection is allowed to abut against an inner peripheral surface of the retraction portion.

\* \* \* \* \*